United States Patent
Yang et al.

(10) Patent No.: US 7,174,747 B2
(45) Date of Patent: Feb. 13, 2007

(54) USE OF CORRUGATED HOSE FOR ADMIX RECYCLING IN FIBROUS GLASS INSULATION

(75) Inventors: Alain Yang, Bryn Mawr, PA (US); Murray S. Toas, Norristown, PA (US); Mark Trabbold, Harleysville, PA (US)

(73) Assignee: CertainTeed Corporation, Valley Forge, PA (US)

( * ) Notice: Subject to any disclaimer, the term of this patent is extended or adjusted under 35 U.S.C. 154(b) by 341 days.

(21) Appl. No.: 10/175,655

(22) Filed: Jun. 20, 2002

(65) Prior Publication Data

US 2003/0233851 A1 Dec. 25, 2003

(51) Int. Cl.
C03C 17/02 (2006.01)
E04B 1/62 (2006.01)

(52) U.S. Cl. .......................... 65/517; 442/327
(58) Field of Classification Search ........ 264/119–121; 65/377, 469, 516–518, 521; 442/327; 241/29, 241/24.1, 79.1, 159, 185.5
See application file for complete search history.

(56) References Cited

U.S. PATENT DOCUMENTS

| | | | | |
|---|---|---|---|---|
| 2,719,336 A | * | 10/1955 | Stotler | 19/51 |
| 3,709,670 A | * | 1/1973 | Eriksen | 65/469 |
| 4,164,534 A | * | 8/1979 | Ogino | 264/117 |
| 4,244,720 A | * | 1/1981 | Boen et al. | 65/377 |
| 4,347,985 A | * | 9/1982 | Simpson | 241/1 |
| 5,000,788 A | | 3/1991 | Stotler | |
| 5,035,936 A | * | 7/1991 | Dockrill et al. | 428/96 |
| 5,578,258 A | | 11/1996 | Grant et al. | |
| 5,611,882 A | | 3/1997 | Riebel et al. | |
| 6,206,050 B1 | * | 3/2001 | Kelley et al. | 138/129 |
| 6,565,022 B1 | * | 5/2003 | Clements | 241/29 |
| 6,673,280 B1 | | 1/2004 | Yang et al. | |
| 2003/0049488 A1 | * | 3/2003 | Yang et al. | 428/688 |
| 2003/0087576 A1 | * | 5/2003 | Yang et al. | 442/417 |

OTHER PUBLICATIONS

Perry's Chemical Engineers' Handbook (7th Edition), Copyright 1997, p. 10-109.*
2001 ASHRAE Handbook, Fundamentals, pp. 23.4, 23.5.

* cited by examiner

*Primary Examiner*—Eric Hug
*Assistant Examiner*—Carlos Lopez
(74) *Attorney, Agent, or Firm*—Duane Morris LLP

(57) ABSTRACT

The present invention relates to a method for improving the thermal performance of fibrous glass insulation in the admix recycling of the insulation, which includes the use of corrugated hose in the recycling process.

8 Claims, 1 Drawing Sheet

USE OF CORRUGATED HOSE FOR ADMIX RECYCLING IN FIBROUS GLASS INSULATION

BACKGROUND OF THE INVENTION

Insulation assemblies and, more particularly mineral fibers, including fibrous glass insulation assemblies are known in the art. Fibrous insulation assemblies are used for insulating buildings. The insulation assemblies take the form of batts or rolls which are compressed for packaging and transport. Many prior art insulation assemblies are sized along their side edges by slicing or cutting the side edges to the desired shape and width.

In contrast to textile and reinforcement fibers, glass wool fibers are produced by processes which generate noncontinuous fibers of random lengths. Glass wool products are best known for their properties such as thermal or acoustical insulation, and as filtration media.

Various glass compositions have been used for wool products. Factors affecting the choice of the glass composition are the availability and cost of the raw materials, the melting cost, the forming process used (glass liquidus and viscosity requirements), and the product properties (durability, resilience). For example, the low-cost rock and slag wool compositions have a high liquidus and therefore cannot be formed by the rotary process. These compositions are fiberized instead by an air blast process or a rotating disk or multiple rotating drum process, resulting in a high-shot (droplets of glass that have not been fiberized) content.

Due to the high surface area of the wool fibers, the glass must be resistant to water attack and, for some applications have good chemical durability.

The most familiar application for wool products is for thermal insulation. The random intertwining of many small fibers effectively traps air within the insulation pack, thus providing the insulating properties. Also, the fibers tend to block radiative heat transfer due to their optical properties. The characteristics of fire resistance, chemical stability, and resistance to moisture attack make glass an ideal material for this application.

The same ability to trap air makes glass fiber a suitable acoustical insulation. This has led to the use of glass fiber as ceiling and wall panels in buildings and vehicles, and to its use in air handling systems where noise control is important.

The fiber diameter of the wool products is an important indicator of its performance. In general, finer fiber products are more costly to produce, but provide better thermal and acoustical performance per pound of glass. Current technology can produce average fiber diameters that range from about 1 to 25 um. In a wool pack, the fiber diameter will vary considerably from the average value.

In most glass wool products, a phenolic binder is added during the manufacturing process to bond the mat together. Depending on the application, the amount of binder can vary between 4 and 15 percent by weight.

The present method of use is directed to an improvement in the recycling of fibrous glass insulation, in order to reduce thermal conductivity and improve product appearance.

SUMMARY OF THE INVENTION

The present invention relates to the use of corrugated hose for admix recycling in fibrous glass insulation, in order to reduce thermal conductivity and improve product appearance. The use of corrugated hoses serves to improve the opening of admix nodules, and reduces their density. By "corrugated" it is meant shaped into folds, or parallel and alternating ridges and grooves. Advantages of the method of the present invention include (1) a more uniform appearance of product with less color and density contrast between virgin fibers and recycled admix, and (2) an improved thermal performance/reduced thermal conductivity.

DESCRIPTION OF THE PREFERRED EMBODIMENTS

Figure 1:
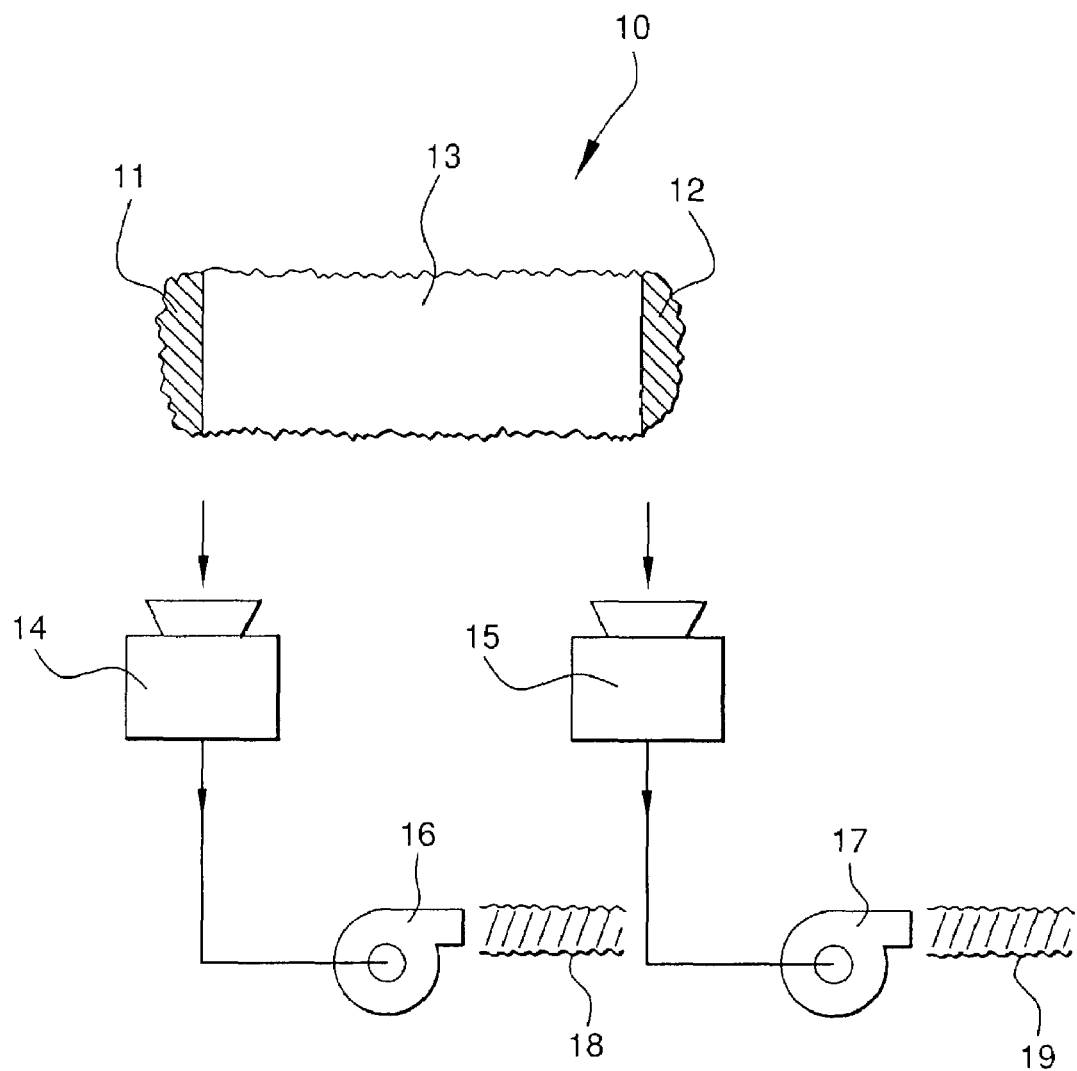
FIG. 1 is a diagrammatic view showing corrugated hoses in place of smooth metallic pipes in the admix recycling circuit.

The following is a preferred embodiment of the present invention:

In the forming section where a glass mat is formed, virgin fiber is produced and liquid binder applied to the fiber. Pieces of recycled fiber mat are also added in the forming section. The formed glass mat composed of virgin binder, uncured binder, and recycled fiber mat is then conveyed from the forming section to the curing oven where the oven cures the binder and sets the fiberglass mat to the proper thickness. The recycled fiber mat is conveyed to the forming section from the edge trim section near the exit of the curing oven. Referring to FIG. 1, after the cured, hot fiberglass mat 10 exits the curing oven, it is cooled and then conveyed to the edge trim slitter section. The "slitters" on each side of the line then saw off the rough edges of the mat 11 and 12 to produce material 13 with square sides. The rough edge strips from the slitters are cut into small pieces in hammermills 14 and 15 and conveyed by edge trim fans 16 and 17 to the forming section (approximately 150 to 300 feet in length) through a corrugated hose 18 and 19, rather than a smooth pipe. The admix is the cut, cured binder and fiber that is conveyed to the forming section.

Note that after the admix handling fans, corrugated hoses are installed instead of the standard smooth metallic pipes for the admix recycling circuit.

The use of corrugated hoses improves the opening of admix nodules, and reduces their density. Advantageous outcomes include (1) a more uniform appearance of product, with less color and density contrast between virgin fibers and recycled admix, and (2) an improved thermal performance/reduced thermal conductivity.

The following test results (ASTM C518 at a mean temperature of 75 degrees F.) demonstrate the effectiveness of the present invention in terms of thermal performance improvement, using building insulation product:

|  | Standard (Admix with Smooth Pipe) | Admix with Corrugated Hose | |
| --- | --- | --- | --- |
|  |  | A | B |
| Insulation Product Density (lb./ft$^3$) | 0.82 | 0.82 | 0.79 |

|  | Standard | Admix with Corrugated Hose | |
|---|---|---|---|
|  | (Admix with Smooth Pipe) | A | B |
| Thickness (in.) | 3.5 | 3.5 | 3.5 |
| Thermal Conductivity (BTU inch/hr.ft$^2$ ° F.) | 0.271 | 0.268 | 0.271 |
| R-value (hr.ft$^2$ ° F./BTU) | 12.91 | 13.08 | 12.91 |

Thus, for the same R-value as the standard approach, approximately 3.7% less material is required. This represents a significant improvement over conventional systems.

While this invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. In a method for making an insulation product in the form of a glass mat, comprising the steps of:
conveying recycled fiber mat comprised of small pieces through smooth pipes; adding the recycled fiber mat to virgin fiber and a binder; forming a glass mat comprised of, the virgin fiber, the binder and the recycled fiber mat that was conveyed through the smooth pipes; and curing the binder to form the insulation product in the form of the glass mat, wherein the glass mat has a measured density and a corresponding thermal conductivity;
the improvement comprising the step of;
conveying the recycled fiber mat through corrugated hoses, prior to performing further steps of; adding the recycled fiber mat to the virgin fiber and the binder; forming a glass mat thereof comprised of the virgin fiber, the binder and the recycled fiber mat that was conveyed through the corrugated hoses; and curing the binder; such that, said glass mat thereof;
(a) is of lower corresponding thermal conductivity where said glass mat thereof has a measured density that is equal, by comparison, to said measured density of the glass mat comprised of, the virgin fiber, the binder and the recycled fiber mat that was conveyed through the smooth pipes, or
(b) is of unchanged corresponding thermal conductivity where said glass mat thereof has a measured density that is exceeded by said measured density of the glass mat comprised of, the virgin fiber, the binder and the recycled fiber mat that was conveyed through the smooth pipes.

2. The method of claim 1, wherein the step of, conveying the recycled fiber mat though corrugated hoses, further comprises, using fans to convey the recycled fiber mat though the corrugated hoses.

3. The method of claim 2, further comprising:
taking edge strips off of the insulation product; and
cutting the edge strips to form the recycled fiber mat comprised of small pieces.

4. The method of claim 1, further comprising:
taking edge strips off of the insulation product; and
cutting the edge strips with hammermills to form the recycled fiber mat comprised of small pieces.

5. The method of claim 1, wherein the step of, conveying the recycled fiber mat though corrugated hoses, further comprises, conveying the recycled fiber mat though corrugated hoses, such that, the glass mat having the virgin fiber, the binder and the recycled fiber mat that was conveyed though the corrugated hoses, has less color contrast between the virgin fiber and the recycled fiber mat compared to said glass mat having the virgin fiber, the binder and the recycled fiber mat that was conveyed through the smooth pipes.

6. The method of claim 1, wherein the step of, conveying the recycled fiber mat though corrugated hoses, further comprises, conveying the recycled fiber mat though corrugated hoses, such that, the glass mat having the virgin fiber, the binder and the recycled fiber mat that was conveyed though the corrugated hoses, has less color contrast between the virgin fiber and the recycled fiber mat compared to said glass mat having the virgin fiber, the binder and the recycled fiber mat that was conveyed though the smooth pipes; and
wherein the step of conveying the recycled fiber mat though corrugated hoses rather than though the smooth pipes further comprises, using fans to convey the recycled fiber mat to the forming section through the corrugated hoses rather than through the smooth pipes.

7. The method of claim 6, wherein the step of, conveying the recycled fiber mat through corrugated hoses rather than through the smooth pipes, further comprises, conveying the recycled fiber mat through corrugated hoses rather than through the smooth pipes such that, the glass mat having the virgin fiber, the binder and the recycled fiber mat that was conveyed through the corrugated hoses, has less color contrast between the virgin fiber and the recycled fiber mat compared to said glass mat having the virgin fiber, the binder and the recycled fiber mat that was conveyed through the smooth pipes; and further comprising:
taking edge strips off of the insulation product; and
cutting the edge strips to form the recycled fiber mat comprised of small pieces.

8. The method of claim 1, wherein the step of, conveying the recycled fiber mat through corrugated hoses rather than through the smooth pipes, further comprises, conveying the recycled fiber mat to the forming section through corrugated hoses rather than through the smooth pipes, such that, the glass mat having the virgin fiber, the binder and the recycled fiber mat that was conveyed through the corrugated hoses, has less color contrast between the virgin fiber and the recycled fiber mat compared to said glass mat having the virgin fiber, the binder and the recycled fiber mat that was conveyed through the smooth pipes; and further comprising:
taking edge strips off of the insulation product; and
cutting the edge strips with hammermills to form the recycled fiber mat comprised of small pieces.

* * * * *